United States Patent
Narayanaswamy

(10) Patent No.: US 7,090,270 B2
(45) Date of Patent: Aug. 15, 2006

(54) METHOD AND APPARATUS FOR SUSPENDING AN OBJECT, SUCH AS A HOT GLASS OBJECT

(76) Inventor: Onbathiveli S. Narayanaswamy, 26610 Hass Ave., Dearborn Heights, MI (US) 48127

( * ) Notice: Subject to any disclaimer, the term of this patent is extended or adjusted under 35 U.S.C. 154(b) by 95 days.

(21) Appl. No.: 10/871,913

(22) Filed: Jun. 18, 2004

(65) Prior Publication Data

US 2006/0071491 A1 Apr. 6, 2006

(51) Int. Cl.
*B66C 1/48* (2006.01)

(52) U.S. Cl. .................................. 294/118; 294/81.61

(58) Field of Classification Search ............. 294/106, 294/110.1, 118, 81.3, 81.61, 67.5; 65/106, 65/273, 289; 248/610–613, 491, 330.1

See application file for complete search history.

(56) References Cited

U.S. PATENT DOCUMENTS

| | | | | |
|---|---|---|---|---|
| 2,477,911 A | * | 8/1949 | Travis | 248/343 |
| 2,619,314 A | * | 11/1952 | Doolittle | 248/317 |
| 2,710,493 A | * | 6/1955 | Glynn | 294/119 |
| 3,454,298 A | * | 7/1969 | Bognar | 294/118 |
| 3,456,985 A | * | 7/1969 | Bullock | 294/119 |
| 3,850,420 A | * | 11/1974 | Marceau et al. | 269/46 |
| 3,913,966 A | * | 10/1975 | Richards | 294/118 |
| 4,076,514 A | * | 2/1978 | Kelly | 65/106 |
| 4,240,660 A | * | 12/1980 | Roth et al. | 294/81.2 |
| 4,283,216 A | * | 8/1981 | Brereton | 65/106 |

* cited by examiner

*Primary Examiner*—Dean J. Kramer
(74) *Attorney, Agent, or Firm*—Law Offices of John Chupa & Associates, P.C.

(57) ABSTRACT

An assembly/apparatus 10 which allows an object 12 to be suspended and supported with a minimal amount of structural deformation. The assembly accomplishes this object by the inclusion of substantially identical and commercially available constant force spring assemblies, such as constant force spring assemblies 20, 22, and a suspension monorail loop 24 which supports several cases such as case 30, 32.

10 Claims, 1 Drawing Sheet

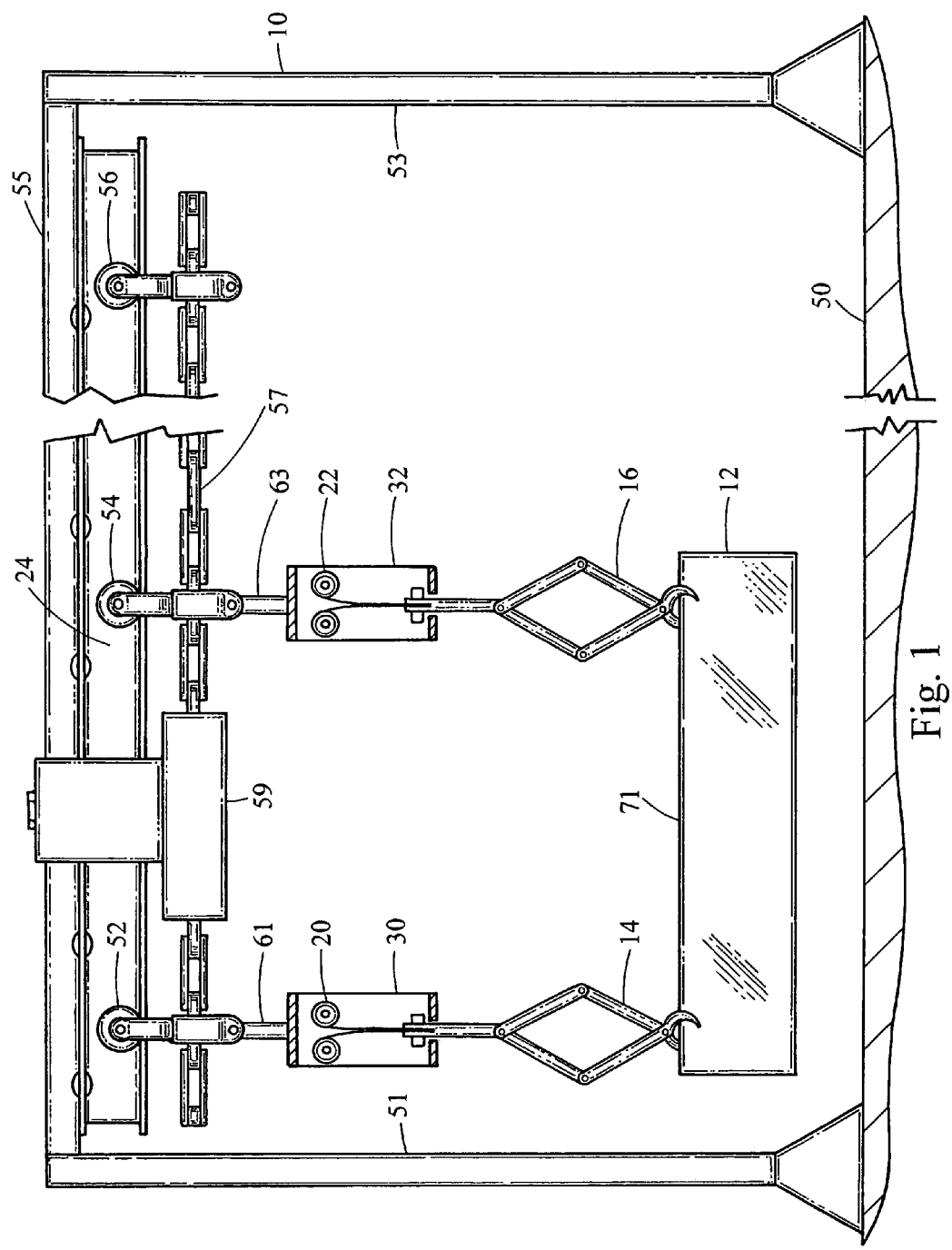

METHOD AND APPARATUS FOR SUSPENDING AN OBJECT, SUCH AS A HOT GLASS OBJECT

FIELD OF THE INVENTION

The present invention generally relates to a method and an apparatus for suspending and/or supporting an object, such as a hot glass object and more particularly, to a method and an apparatus for suspending an object which allows the reaction forces associated with the suspended object to be fixed and which further allows the tilting moment associated with the suspended object to also be fixed and/or to be substantially eliminated.

BACKGROUND OF THE INVENTION

Many processes involve and/or require the suspension of an object and the movement of this suspended object from one location (e.g., where one step in an overall process may be accomplished) to a second location (e.g., where a second step in an overall process may be accomplished).

By way of example and without limitation, a hot glass object, such as a pre-formed and substantially curved hot glass object, is typically required to be suspended and moved from one location to another as the object is "processed" or formed into an automobile glazing.

While prior techniques and strategies do allow the suspension and transport of such objects, they suffer from some drawbacks. By way of example and without limitation, prior suspension and transport of a heated glass object typically caused the heated glass object to be undesirably and non-uniformly deformed. That is, one prior technique associated with the suspension and transport of a heated glass object is described within U.S. Pat. No. 3,456,985 ("the '985 patent") which is fully and completely incorporated herein by reference, word for word and paragraph for paragraph.

Particularly, as the '985 patent describes, it is customary to suspend and carry a heated glass object by the use of tongs which locally (e.g., at the point at which each of the tongs respectively "meet" or couple to the heated glass object) and undesirably deform the glass object. The deformation is greatly exacerbated by the fact that each of the tongs typically carries a different fraction of the overall weight of the suspended object and thusly each of the tongs respectively deforms the suspended object by a different and visually noticeable amount. Typically, the distribution of the weight of the suspended object among the tongs is unknown and/or uncontrolled and thusly a titling moment is created, about the center of gravity of the suspended object which, if not relieved by rotation of suspended object, further increases the afore-described tong deformation.

One approach to overcoming these disadvantages is found within the Great Briton patent GB473604 ("the '604 patent") which is similarly and completely incorporated herein by reference, word for word and paragraph for paragraph. While the '604 patent did attempt to evenly distribute the weight of the glass among the various connectors, it is only applicable to glass that is not "press-formed" and requires a cascade of mechanical balance frames which are costly and un-wieldly. The teachings of the '604 patent cannot be employed within a known curved glass manufacturing process.

There is therefore a need for a new and improved apparatus and method for suspending an object which overcomes the various and previously delineated disadvantages associated with prior techniques and strategies.

SUMMARY OF THE INVENTION

It is a first non-limiting object of the present invention to provide a method and an apparatus for suspending an object.

It is a second non-limiting object of the present invention to provide a method and an apparatus for suspending an object in a manner which overcomes the various disadvantages associated with prior techniques and strategies.

It is a third non-limiting object of the present invention to provide a method and an apparatus for suspending a heated and curved glass object while minimizing deformation of the object.

According to a first non-limiting aspect of the present invention, an apparatus for suspending an object is provided. Particularly, the apparatus includes a first portion which is attached to the object and which suspends the object, thereby creating a plurality of reaction forces and a moment; and a second portion which allows the plurality of reaction forces and the moment to be fixed.

According to a second non-limiting aspect of the present invention, an apparatus is provided and includes a first portion which is attached to an object at a plurality of suspension points, the object having a certain weight; and a second portion which allows the weight of the object to be substantially and evenly distributed at each of the suspension points.

According to a third non-limiting aspect of the present invention, a method of suspending a glass object having a certain weight, is provided. Particularly, the method includes the steps of providing a first and a second constant force spring; providing a first and a second clamp; coupling the first clamp to a first portion of the glass object; coupling the second clamp to a second portion of the glass object; coupling the first constant force spring to the first clamp; coupling the second constant force spring to the second clamp; and coupling the first and the second constant force springs to an elevated member, thereby suspending the glass object.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 1 is a diagrammatic view of an apparatus made in accordance with the teachings of the preferred embodiment of the invention.

DETAILED DESCRIPTION OF THE PREFERRED EMBODIMENT OF THE INVENTION

Referring now to FIG. 1, there is shown an object suspension and supporting assembly/ apparatus 10 which is made in accordance with the teachings of the preferred embodiment of the invention and which is adapted to be attached to and to suspend and support an object such as, by way of example and without limitation, a heated flat or curved glass object, such as object 12. It should be appreciated that any other type of object may also be suspended and supported by the assembly and apparatus 10 and that nothing in this description is meant to limit the invention to use only with a glass object.

Particularly, the assembly 10 includes first portion which is removably attached to the object 12. In this non-limiting exemplary embodiment, this first portion includes several clamps or self-closing tongs, such as clamps or tongs 14, 16. In a further non-limiting embodiment of the invention, the tongs used to construct this first portion may be substantially identical to the tongs which are described within the '985 and/or the '604 patents.

Further, as shown in FIG. 1, the apparatus/assembly 10 includes a second portion which, in this non-limiting and exemplary embodiment, includes several substantially identical and commercially available constant force spring assemblies, such as constant force spring assemblies 20, 22 and a suspension monorail loop 24 which is typically positioned above or elevated with respect to the object 12 and which supports several cases, such as cases 30, 32. Each of the cases 30, 32 operatively houses a unique one of the constant force springs 20, 22 and each case 30, 32 allows the respectively housed constant force spring 20, 22 to be respectively attached to a unique one of the self-closing tongs or clamps 14, 16. Bottom portion of each case 30, 32 acts as a mechanical stop to fix the elongation of constant force spring 20, 22 which has essentially zero stiffness. In this manner, as is shown in FIG. 1, the object 12 is elevated above the ground 50 by the rail 24 (which itself may be supported on the ground 50 by columns 51, 53 and the frame 55) and, more particularly, by virtue of the cooperative arrangement of the springs, such as spring assemblies 20, 22 and the tongs/clamps, such as tongs/clamps 14, 16. That is, the rail 24 (which is elevated from the ground 50 by the columns 51, 53 to which the top frame 55 is connected) is coupled to the object 12 by unique connector assemblies, each of which comprise a unique combination of a spring assembly and a clamp/tong. In a non-limiting embodiment of the invention, the cases, such as 30, 32, are movably attached to the rail 24, thereby allowing the suspended or carried object 12 to be moved or transported. Such movable attachment may be made by use of wheels 52, 54, 56 riding on rail 24 and an endless chain, such as chain 57, which is coupled to a motor assembly, such as motor assembly 59, and which is mounted on the top frame 55. Wheels 52, 54 are coupled to each of the cases, such as cases 30, 32, by rods 61, 63.

Each of the constant force spring assemblies 20, 22 respectively exerts a substantially constant "pulling" force (i.e., the "pulling force" lies along a direction extending from the object 12 towards the top frame 55) which is substantially independent of its respective elongation. This permits a designer of the apparatus/assembly 10 to fix each of the reaction forces (i.e., the equal and opposite force which occurs in response to the various respective pulling force and which cooperatively equals the amount of the overall weight of the object 12). That is, each of the tongs/clamps, such as clamp/tongs 14, 16 pulls the glass object 12 and each pulling force causes an equal and opposite reaction force to be generated by the suspended object and the total reaction force is equal to the overall weight of the glass object (or any other suspended object) 12. Each clamp/tong, such as clamp/tongs 14, 16 similarly has a moment or rotational force about the center of gravity of the suspended object 12 and total amount of these moment forces equals to the total moment experienced by the suspended object 12 about its center of gravity. In the most preferred embodiment of the invention, each of the pulling forces is substantially equal and, more particularly, the moment is zero. Such a "zero moment" is achieved, in practice by ensuring that the resultant of reaction forces passes through the center of gravity of the suspended object 12. One strategy to accomplish such a "zero moment" is to distribute the clamps/tongs along the edge 71 so their average location (x and y coordinates) coincides with that of the center of gravity of the object 12. Two tests were conducted on slightly curved glass at room temperature to verify the efficacy of this invention.

In the first test, the assembly 10 was modified by removing all of the constant force spring assemblies, such as constant force spring assemblies 20, 22 and replacing them with standard load measuring dial gauge. Particularly, four tongs/clamps were used and were equally spaced apart along the suspended object 12. Each of the gauges were attached, by a chain to a unique one of the tongs/clamps, and each of the gauges were then read, after the object 12 were suspended by the use of suspension rail/assembly 24. Particularly, these gauges revealed that each of the clamps/tongs carried an unequal weight of the object 12 (the first tong/clamp carried about 37% of the overall weight of object 12, the second tong/clamp carried about 13% of the overall weight of the object 12, the third tong/clamp carried about 13% of the overall weight of the object 12, and the fourth and last tong/clamp carried about 37% of the overall weight of the object 12). Importantly, each of the gauge readings was adjusted by subtracting from the reading the previously observed weight of the clamp/tong and the chain to which it was respectively attached. If this test were to be done on hot glass, the unequal weight distribution would cause undesirably non-uniform distortion in the suspended glass object as noted in '985 patent. Also, if the suspended object is deeply curved and its suspension system permits, the object noticeably rotates under non-selective weight distribution and locations of the tongs. If the suspension system restrains rotation, then the restraint creates a moment and contributes to additional undesirable distortion of hot glass object.

In the second test, the assembly 10 was modified by coupling a unique load gauge, by use of a chain, between a spring assembly and a tong/clamp 14. After the object 12 was suspended and after adjusting the load data for the weight of the various chains and the clamps, in the manner previously indicated (i.e., the data from a load gauge was subtracted by a number equal to the sum of the weight of the chain and the tong/clamp to which it was attached), the load gauges indicated that each spring assembly carried a substantially equal amount of the weight of the object 12 (about 25%).

It is to be understood that the invention is not limited to the exact construction and method which has been illustrated above, but that various changes and modifications may be made without departing from the spirit and the scope of the invention as is more fully delineated in the following claims. It should be further understood that the invention is not limited to the use of a constant force spring assembly. Rather, the constant force spring assemblies, such as constant spring force assemblies 20, 22, may be replaced by any assembly which provides a substantially constant force with which to suspend a member or an object. Examples of such suitable replacements may include, but are not limited to, very soft springs, an electromagnetic-assembly, dead weights, or any combination of these apparatuses/devices. Further, it should be appreciated that the moment created by the reaction forces may be fixed by a user of the assembly 10 by simply determining or fixing the location upon the edge 71 that the tongs/clamps will be connected to (i.e., the connection point) and that in the foregoing example, a substantially uniform carrying weight distribution was achieved at each of the connection or suspension points, with substantially no moment. Further, it should be appreciated that the reaction forces are fixed, by user, by the use of the constant force spring. Further, it should be realized that this substantially uniform weight distribution at each suspension point (i.e., at each point along the edge 71 to which a tong/clamp, such as tong/clamps 14, 16 are attached) minimizes the amount of structural deformation which occurs upon the suspended object 12 and that a substantial lack of a moment further minimizes such structural deformation.

The invention claimed is:

1. A method of suspending a hot glass object having a certain weight, said method comprising the steps of providing a first and a second constant force device; providing a first and a second clamp; coupling the first clamp directly to a first portion of said glass object; coupling said second clamp directly to a second portion of said glass object; coupling said first constant force device to said first clamp; coupling said second constant force device to said second clamp; and coupling said first and said second constant force devices to an elevated member, thereby suspending said glass object;

wherein said first and said second constant force devices are substantially identical;

wherein each of said first and said second constant force devices comprise a constant force spring.

2. The method of claim 1 further comprising the steps of ensuring that each of said first and second clamps carry a substantially equal share of said weight of said glass object.

3. The method of claim 2 further comprising the step of ensuring that the tilting moment associated with said suspended glass member is substantially zero.

4. The method of claim 1 wherein said glass object is curved.

5. The method of claim 4 wherein said glass object is press-formed.

6. A method of suspending a hot glass object having a certain weight, said method comprising the steps of providing a first and a second soft spring device; providing a first and a second clamp; coupling the first clamp directly to a first portion of said glass object; coupling said second clamp directly to a second portion of said glass object; coupling said first soft spring device to said first clamp; coupling said second soft spring device to said second clamp; and coupling said first and said second soft spring devices to an elevated member, thereby suspending said glass object;

wherein said first and said second soft spring devices are substantially identical;

wherein each of said first and said second soft spring devices comprise a very soft spring.

7. The method of claim 6 further comprising the steps of ensuring that each of said first and second clamps carry a substantially equal share of said weight of said glass object.

8. The method of claim 7 further comprising the step of ensuring that the tilting moment associated with said suspended glass member is substantially zero.

9. The method of claim 6 wherein said glass object is curved.

10. The method of claim 9 wherein said glass object is press-formed.

* * * * *